United States Patent
Faul et al.

(10) Patent No.: US 6,622,608 B1
(45) Date of Patent: Sep. 23, 2003

(54) VARIABLE STANDOFF EXTENDABLE ARMOR

(75) Inventors: Jeffrey Faul, Santa Clara, CA (US); Kenneth B. Groves, Santa Clara, CA (US); Valent Horvatich, Santa Clara, CA (US)

(73) Assignee: United Defense LP, Arlington, VA (US)

( * ) Notice: Subject to any disclaimer, the term of this patent is extended or adjusted under 35 U.S.C. 154(b) by 0 days.

(21) Appl. No.: 10/185,348

(22) Filed: Jun. 26, 2002

Related U.S. Application Data
(60) Provisional application No. 60/301,182, filed on Jun. 26, 2001.

(51) Int. Cl.[7] .................. F41H 5/007; F41H 5/013
(52) U.S. Cl. .............. 89/36.17; 89/36.02; 89/36.09
(58) Field of Search .................. 89/36.17, 36.02, 89/36.09

(56) References Cited

U.S. PATENT DOCUMENTS

| | | | |
|---|---|---|---|
| 5,333,532 A | * | 8/1994 | Smirlock et al. .......... 89/36.02 |
| 5,577,432 A | * | 11/1996 | Becker et al. ............ 89/36.17 |
| 5,915,291 A | * | 6/1999 | Weihrauch et al. ........ 89/36.01 |

FOREIGN PATENT DOCUMENTS

| | | | | |
|---|---|---|---|---|
| DE | 41 22 622 A1 | * | 1/1993 | |
| JP | 3-67999 | * | 3/1991 | ............... 89/36.17 |

OTHER PUBLICATIONS

English translation of JP 3–67999.*

* cited by examiner

*Primary Examiner*—Stephen M. Johnson
(74) *Attorney, Agent, or Firm*—The Kline Law Firm

(57) ABSTRACT

A method of achieving a variable standoff distance on an armored vehicle or structure between a standoff plate and a base armor plate. The method comprises building the armor system with the base armor plating covered by a layer of electromagnetic material, and standoff plates also covered by a layer of electromagnetic material. The standoff plates are movably attached to the base armor plate. The base and standoff plates are oriented so that the two layers of electromagnetic material face each other. The amount of standoff distance is varied depending on the type of threat recognized by a sensor system.

15 Claims, 1 Drawing Sheet

VARIABLE STANDOFF EXTENDABLE ARMOR

This application claims priority from provisional application 60/301,182filed on Jun. 26, 2001, now abandoned.

BACKGROUND OF THE INVENTION

1. Field of the Invention

The present invention relates generally to methods of protecting structures, and more particularly is a means of varying the distance of separation between a standoff plate and a base armor material on an armored military vehicle or other armored structure.

2. Description of the Prior Art

Construction of armored military vehicles and structures always involves balancing opposing objectives. The vehicles and temporary structures need to be as light and compact as possible for maneuverability, yet heavy, bulky armor is desirable for survivability when under attack. Static structures also benefit from protection that will identify and adapt to the threat, and require less bulk material.

It is well known that armor mass efficiency can be enhanced by incorporating a standoff plate separated from the base armor material. The standoff plate creates a distance of separation from the base armor in which shell fragments can be turned, shattered, and caught. The standoff distance has some penalty when applied in static armor solutions due to the necessity of increasing the overall volume to accommodate the standoff plates. Moreover, optimal standoff distance is threat dependent, which is to say that the optimal standoff distance will vary depending on the nature of the threat presenting itself in any given instance.

Accordingly, it is an object of the present invention to provide an armor system with a variable standoff distance between an outer standoff plate and a base armor.

It is a further object of the present invention to vary the standoff distance on the basis of the characteristics of a detected threat.

Another object of the present invention is to incorporate electrical/magnetic responsive signature management situation awareness sensors, communication antennas, radar, and off-vehicle threat countermeasures into the standoff plate and/or the base armor.

SUMMARY OF THE INVENTION

The present invention is a method of achieving a variable standoff distance on an armored vehicle between a standoff plate and a base armor plate. The method comprises building the vehicle with the base armor plating incorporating at least one layer of electromagnetic responsive material, and standoff plates also incorporating at least one layer of electromagnetic responsive material. The standoff plates are movably attached to the base armor plate.

The magnetic energy product can be greatly enhanced by the application of new magnetic nanomaterial processes.

Distributing sensors, communication antennas, radar elements, and/or threat countermeasures throughout the armor will increase redundancy, improve graceful degradation by reducing single-point failure susceptibility, and thereby improve overall survivability. Incorporating electrical and magnetic responsive layers without significantly affecting the mass efficiency of the armor material is key to the success of this approach.

With this arrangement, the application of a relatively small current can be used to create a repulsing magnetic field between the two layers of armor. The magnetic field causes the standoff plate to be moved further away from the base armor, thereby increasing the standoff distance of the armor. The amount of standoff distance is varied depending on the type of threat recognized by a sensor system. The sensor system may or may not be incorporated into the armor surface.

An advantage of the present invention is that the standoff distance can be varied in response to differing threats.

Another advantage of the present invention is that the armor mass efficiency is enhanced, thereby enhancing performance characteristics of the armor system.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
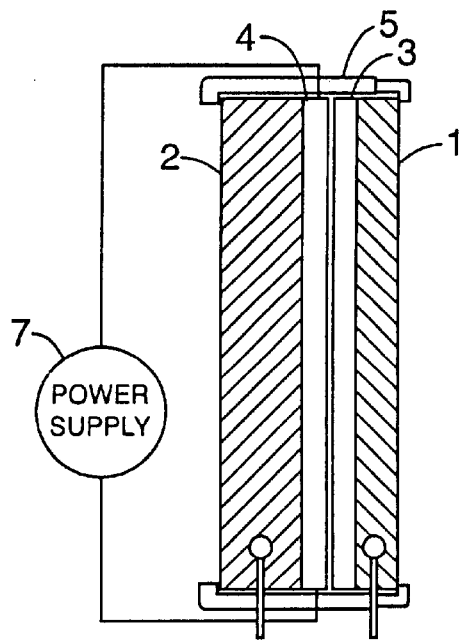
FIG. 1 is a schematic view of an armor system using the method of the present invention in a default configuration.
Figure 2:
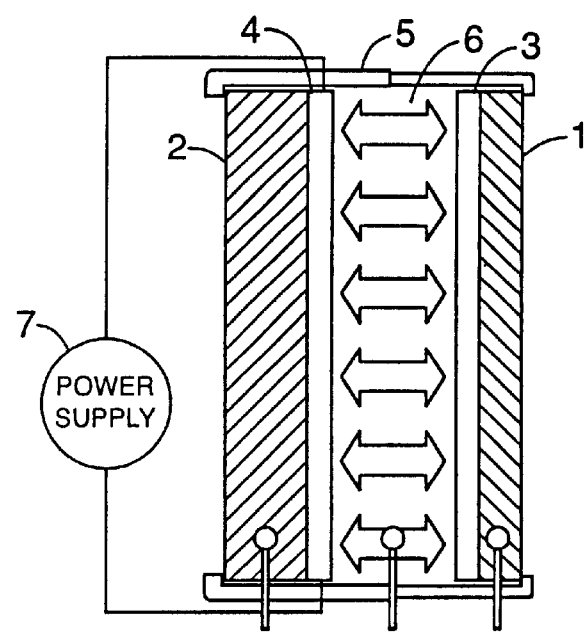
FIG. 2 is a schematic view of an armor system using the method of the present invention in an extended configuration.

Referring to FIGS. 1 and 2, the present invention is a method of achieving a variable standoff distance between a standoff plate 1 and a base armor plate 2. The method will typically be used for the protective armor on mobile or stationary systems such as a military combat vehicle or a high value commercial or public asset. It should be understood that there can be any number of sets of base armor plates 2 and standoff plates 1 on a given application. The description following will refer to a single set.

The standoff plate 1 and the base armor plate 2 are each may incorporate one or more layers of nanomaterial 3, 4. A nanomaterial exhibiting unique bulk properties such as high magnetic energy that is typically formed from particles one nanometer to fifty nanometers in size. There are many methods for forming a suitable bulk material from nanomaterial, including chemical self-forming, high energy compaction, and sintering material with nano-scale grain structure. The unique properties of the material formed are controlled by varying the size and composition of the particles. The dependence of bulk material on the small grain size is the defining factor of unique nanomaterials.

The standoff plate 1 is movably attached by a connection means 5 to the base armor plate 2. The base plate 2 and the standoff plate 1 are oriented so that the two layers of material 3, 4 are adjacent to each other. The connection means 5 must enable the two plates 1, 2 to move relative to each other. In addition to moving so as to vary the size of the standoff gap 6, the connection means 5 must also enable standoff plate 1 to rotate relative to the base armor 2. That is, an angle between the inner face of material 3 and an outer face of material 4 also varies. (More explanation of the rotation of standoff plate 1 follows below.)

A power supply 7 on a subject system is used to apply a current to the electromechanical system. This creates an electromagnetic field in the standoff gap 6, which repulses nanomaterial 3 on standoff plate 1. The induced magnetic field causes standoff plate 1 to move away from base plate 2, thereby increasing the size of standoff gap 6. The amount of current applied, and therefore the size of the standoff gap 6, is varied according to the optimal standoff distance determined for a threat detected by a sensor system. Utilizing high energy material based on nanomaterials for materials 3 and 4, the amount of current required to create the necessary repulsing magnetic field is significantly reduced relative to that which would be required with other materials.

An example of the function of the present invention is as follows: An armor system, such as that shown in FIGS. 1 and 2, is designed to defeat a 7.62 mm AP projectile when in the configuration shown in FIG. 1, with the standoff gap 6 minimized. When the threat warning sensors installed in the system detect and classify a larger threat launch (e.g., 14.5 mm AP), an applied current induces a repulsing magnetic field between the nanomaterials 3, 4, causing the standoff plate 1 to extend to the extended configuration shown in FIG. 2. The armor package of the vehicle is therefore able to defeat the larger threat by creating more distance in the standoff gap 6 to turn, shatter, and catch the bullet fragments. When a threat is detected and classified, only those standoff plates 1 in the impact zone are moved to the extended configuration. Alternatively, all standoff plates 1 could be extended to a baseline distance and adjusted based on threat information, and retracted to reduce shipping volume. Alternate means of standoff armor plate extension and connection include the application of composite electrically-responsive springs or nano-fluidic devices, and these means depend on the application of electromagnetic energy.

Similarly, In addition to this basic translational motion, the standoff plates 1 can also be given rotational motion through precisely controlled miniaturized devices or induced electromagnetic fields. In the preferred embodiment, the rotational motion is accomplished through the use of microelectreomechanical systems (MEMS) that add a minimum of parasitic weight to the system. This added axis of movement gives the armor package additional armor obliquity and defeats even larger armor penetration threats.

In addition to the projectile protection function described above, an armor system utilizing the present invention also has improved signature management. Nanomaterials and MEMS each provide the ability potential to dynamically adjust the armor system's RF properties to reflect incident RF energy at a dynamically adjustable return angle. The materials also selectively absorb incident RF energy at a dynamically tunable frequency. In the arena of visual signature, nanomaterials thereby provide the ability to dynamically adjust both the intensity and wavelength of visual emissions to better match environmental clutter.

Figure 3:
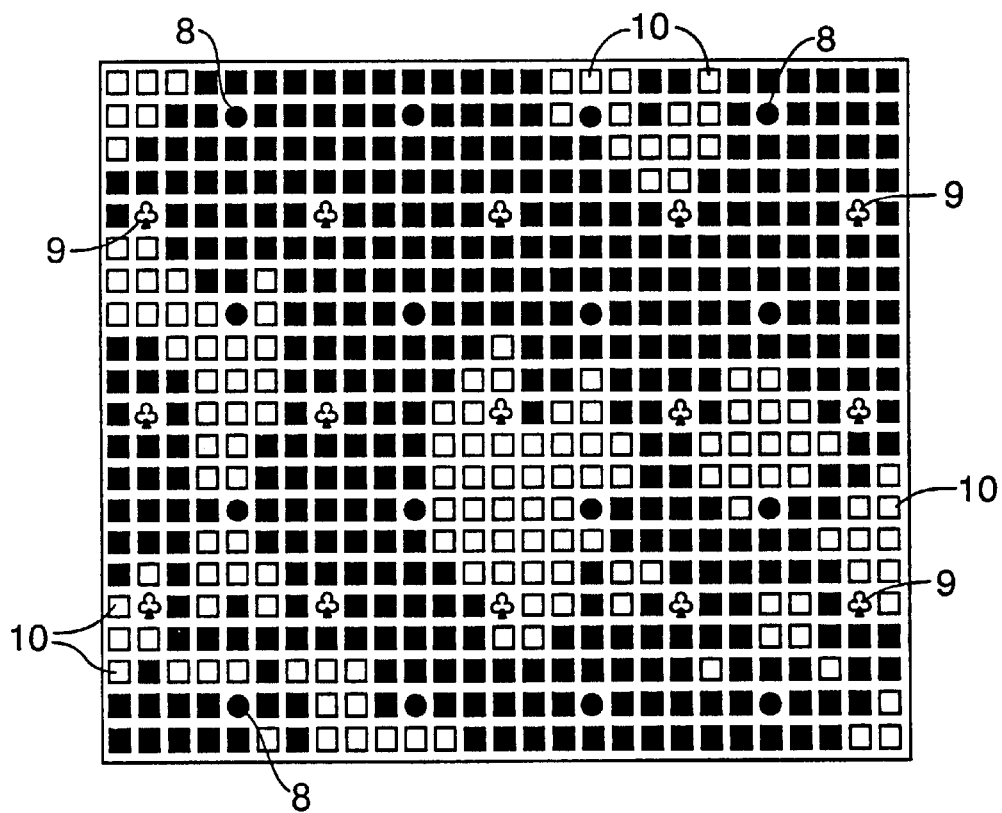
FIG. 3 shows a schematic view of an outer skin of a vehicle using the method of the present invention.

In addition to the integrated sensors of the extendable armor system, countermeasure elements are also integrated into the outer skin of the system. Electronically activated nanomaterials dramatically reduce the size, weight, and cost of threat countermeasures through integration within the skin of the protected system. A resulting skin element of the armor system, as illustrated in FIG. 3, would include the sensor elements 8, countermeasure elements 9, and vehicle signature elements 10.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

We claim:

1. A method of altering an armor system comprising the following steps:
   a) covering an object to be protected with a base armor plate,
   b) applying a first electromagnetic material to at least a portion of said base armor plate,
   c) movably attaching at least one standoff plate to said base armor plate,
   d) applying a second electromagnetic material to said standoff plate, and
   e) when a threat is detected, applying an electrical current to at least one of said electromagnetic materials; such that
   an electromagnetic field is created between said first and said second electromagnetic material, said electromagnetic field thereby causing said standoff plate to move away from said base armor plate while remaining attached to said base armor plate.

2. The method as defined in claim 1 wherein:
said armor system further comprises an integrated multi-spectral sensor system, said sensor system detecting and classifying a threat to said object to be protected.

3. The method as defined in claim 2 wherein:
an amount of said electrical current applied is varied according to a classification of said threat detected.

4. The method as defined in claim 3 wherein:
said standoff plate rotates so as to change an angle between an outer surface of said first electromagnetic material and an inner surface of said second electromagnetic material.

5. The method as defined in claim 3 wherein:
an outer skin of said armor system further comprises at least one integrated countermeasure element.

6. The method as defined in claim 3 wherein:
an outer skin of said armor system further comprises at least one signature modification element.

7. The method as defined in claim 3 wherein:
said armor system further comprises a plurality of said standoff plates, individual standoff plates being activated in response to an impact zone of an incoming threat detected by sensors.

8. The method as defined in claim 2 wherein:
said standoff plate rotates so as to change an angle between an outer surface of said first electromagnetic material and an inner surface of said second electromagnetic material.

9. The method as defined in claim 2 wherein:
an outer skin of said armor system further comprises at least one integrated countermeasure element.

10. The method as defined in claim 2 wherein:
an outer skin of said armor system further comprises at least one signature modification element.

11. The method as defined in claim 2 wherein:
said armor system further comprises a plurality of said standoff plates, individual standoff plates being activated in response to an impact zone of an incoming threat detected by sensors.

12. The method as defined in claim 1 wherein:
said standoff plate rotates so as to change an angle between an outer surface of said first electromagnetic material and an inner surface of said second electromagnetic material.

13. The method as defined in claim 1 wherein:
an outer skin of said armor system further comprises at least one integrated countermeasure element.

14. The method as defined in claim 1 wherein:
an outer skin of said armor system further comprises at least one signature modification element.

15. The method as defined in claim 1 wherein:
said armor system further comprises a plurality of said standoff plates, individual standoff plates being activated in response to an impact zone of an incoming threat detected by sensors.

* * * * *